US012676032B2

(12) United States Patent
Ohashi

(10) Patent No.: US 12,676,032 B2
(45) Date of Patent: Jul. 7, 2026

(54) INFORMATION PROCESSING DEVICE FOR VEHICLE

(71) Applicant: TOYOTA JIDOSHA KABUSHIKI KAISHA, Toyota (JP)

(72) Inventor: Kosuke Ohashi, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/745,474

(22) Filed: Jun. 17, 2024

(65) Prior Publication Data

US 2025/0046127 A1 Feb. 6, 2025

(30) Foreign Application Priority Data

Aug. 4, 2023 (JP) ................................ 2023-127808

(51) Int. Cl.
*G07C 5/00* (2006.01)

(52) U.S. Cl.
CPC .................................... *G07C 5/008* (2013.01)

(58) Field of Classification Search
CPC ...................................................... G07C 5/008
USPC .............................................................. 701/1
See application file for complete search history.

(56) References Cited

U.S. PATENT DOCUMENTS

| | | | | |
|---|---|---|---|---|
| 2008/0284642 | A1* | 11/2008 | Seacat | G01S 5/017 342/357.31 |
| 2016/0028569 | A1* | 1/2016 | Li | H04L 67/12 370/237 |
| 2021/0392454 | A1* | 12/2021 | Choi | H04L 27/2613 |
| 2023/0058660 | A1* | 2/2023 | Kanthimathinathan | G01S 19/14 |

FOREIGN PATENT DOCUMENTS

| | | | |
|---|---|---|---|
| JP | 2009-251968 | A | 10/2009 |
| JP | 2011-48608 | A | 3/2011 |
| JP | 2022-143024 | A | 10/2022 |

* cited by examiner

*Primary Examiner* — Tyler D Paige
(74) *Attorney, Agent, or Firm* — Oblon, McClelland, Maier & Neustadt, L.L.P.

(57) ABSTRACT

An information processing device for a vehicle includes processing circuitry. The processing circuitry is configured to acquire vehicle location information that is information indicating a location of the vehicle, periodically transmit the acquired vehicle location information to a server, and change a transmission interval at which the vehicle location information is transmitted to the server in accordance with a speed range in which a speed of the vehicle is. The speed range is one of at least a first speed range and a second speed range in which a speed of the vehicle is higher than in the first speed range. The processing circuitry is configured to cause the transmission interval in the second speed range to be longer than the transmission interval in the first speed range.

4 Claims, 2 Drawing Sheets

INFORMATION PROCESSING DEVICE FOR VEHICLE

CROSS-REFERENCE TO RELATED APPLICATIONS

This application is based upon and claims the benefit of priority from prior Japanese Patent Application No. 2023-127808, filed on Aug. 4, 2023, the entire contents of which are incorporated herein by reference.

BACKGROUND

1. Field

The present disclosure relates to an information processing device for a vehicle.

2. Description of Related Art

Japanese Laid-Open Patent Publication No. 2022-143024 discloses a system including a server and a vehicle on-board information communication device. The vehicle on-board information communication device transmits location information related to the current location of the vehicle to the server. The vehicle on-board information communication device transmits the location information to the server at the time of congestion such as the occurrence of traffic jam, and suppresses the transmission of the location information at the time of no congestion. With this configuration, the vehicle on-board information communication device efficiently notifies the server of the location of the vehicle during congestion, thereby informing the server of the traffic conditions while minimizing the number of communications when there is no congestion.

Vehicle location information can be utilized not only for acquiring traffic congestion but also for recording the vehicle's travel history or conducting traffic flow surveys. If the communication frequency between the server and a vehicle on-board information processing device that transmits the location information of the vehicle to the server is too low, the location of the vehicle cannot be accurately acquired. On the other hand, if the communication frequency between the information processing device and the server is too high, the load on the information processing device becomes excessive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information processing device for a vehicle includes processing circuitry that is configured to acquire vehicle location information that is information indicating a location of the vehicle, periodically transmit the acquired vehicle location information to a server, and change a transmission interval at which the vehicle location information is transmitted to the server in accordance with a speed range in which a speed of the vehicle is. The speed range is one of at least a first speed range and a second speed range in which the speed of the vehicle is higher than in the first speed range. The processing circuitry is configured to cause the transmission interval in the second speed range to be longer than the transmission interval in the first speed range.

In another general aspect, a method executed by an information processing device for a vehicle is provided. The method includes acquiring vehicle location information that is information indicating a location of the vehicle, periodically transmitting the acquired vehicle location information to a server, and changing a transmission interval at which the vehicle location information is transmitted to the server in accordance with a speed range in which a speed of the vehicle is. The speed range is one of at least a first speed range and a second speed range in which a speed of the vehicle is higher than in the first speed range. The changing the transmission interval in accordance with the speed range in which the speed of the vehicle is includes causing the transmission interval in the second speed range to be longer than the transmission interval in the first speed range.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an information processing device 10 according to an embodiment will be described with reference to FIGS. 1 to 4.

Configuration of Information Processing Device 10

The information processing device 10 is mounted on a vehicle 100. The information processing device 10 is communicably connected to the server 200. The information processing device 10 transmits vehicle location information, which is information on the current location of the vehicle 100, to the server 200. The information processing device 10 constitutes an information processing system together with the server 200. The server 200 manages, for example, information on a congestion situation of a road or information on a travel history of a vehicle on the basis of the vehicle location information. These pieces of information can be utilized for traffic flow investigation or the like. The server 200 collects and analyzes vehicle location information data for a number of vehicles. The server 200 organizes the collected data and provides the organized data to another apparatus.

Figure 1:
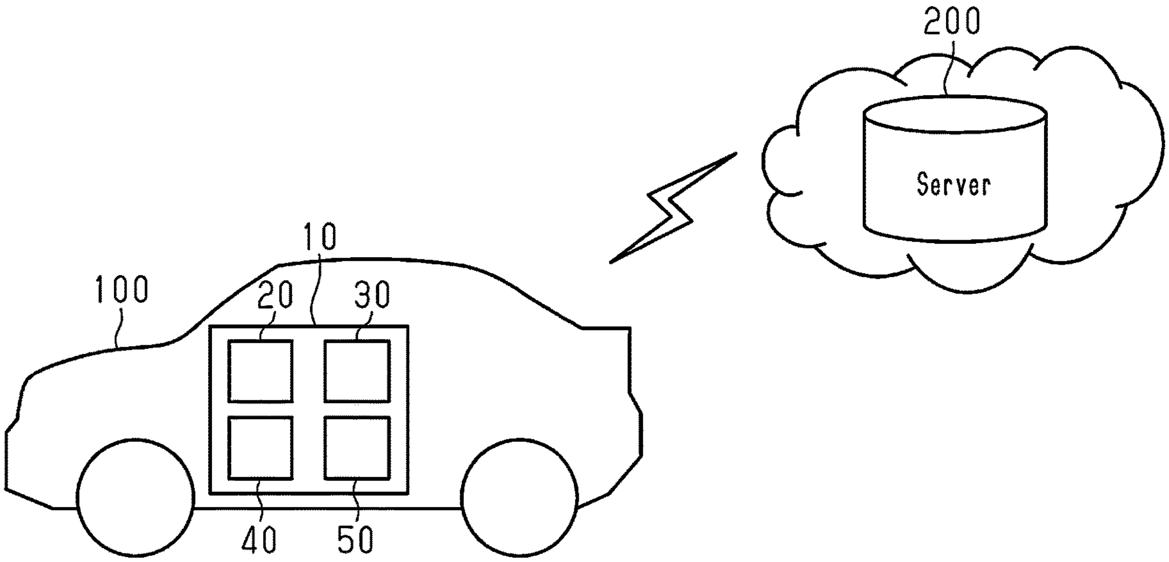
FIG. 1 is a diagram illustrating an example of an information processing system including an information processing device for a vehicle according to an embodiment.

As shown in FIG. 1, the information processing device 10 includes a location information acquiring device (or a location information acquisition circuit) 20, an information transmitting device (or an information transmission circuit) 30, a navigation device (or a navigation circuit) 40, and a storage 50. The location information acquiring device 20 acquires the current location of the vehicle 100. In the present embodiment, the location information acquiring device 20 acquires the current location of the vehicle 100 using a radio wave from a satellite received by a receiver of a satellite positioning system. The information indicating the location of the vehicle 100 acquired by the location information acquiring device 20 is referred to as vehicle location information. The information transmitting device 30 periodically transmits the vehicle location information acquired by the location information acquiring device 20 to the server 200. The navigation device 40 includes a receiver of a satellite positioning system, a display, an input unit, and a storage unit (referred to as a memory or a storage) that stores data such as map information. The navigation device 40 sets a guidance route to a destination and performs route guidance. The storage 50 may include, for example, a random access memory (RAM), a read only memory (ROM), and a hard disk drive (HDD). The storage 50 stores mode information and the like corresponding to speed ranges described below.

The information processing device 10 may include processing circuitry configured to function as the location information acquiring device 20, the information transmitting device 30, and/or the navigation device 40. The processing circuitry may include one or more processors that run on computer programs (software) to execute various processes. The processing circuitry may include one or more dedicated hardware circuits such as an application-specific integrated circuit (ASIC) that executes at least a part of various processes. Alternatively, the processing circuitry may include a combination of one or more processors and one or more dedicated hardware circuits. The processor includes a CPU and a memory such as a RAM and a ROM. The memory stores program codes or instructions configured to cause the CPU to execute processes. Memory or computer-readable media includes any available media that can be accessed by a general purpose or special purpose computer.

Hereinafter, a flow of processing executed in the information processing device 10 will be described in detail with reference to FIG. 2.

Figure 2:
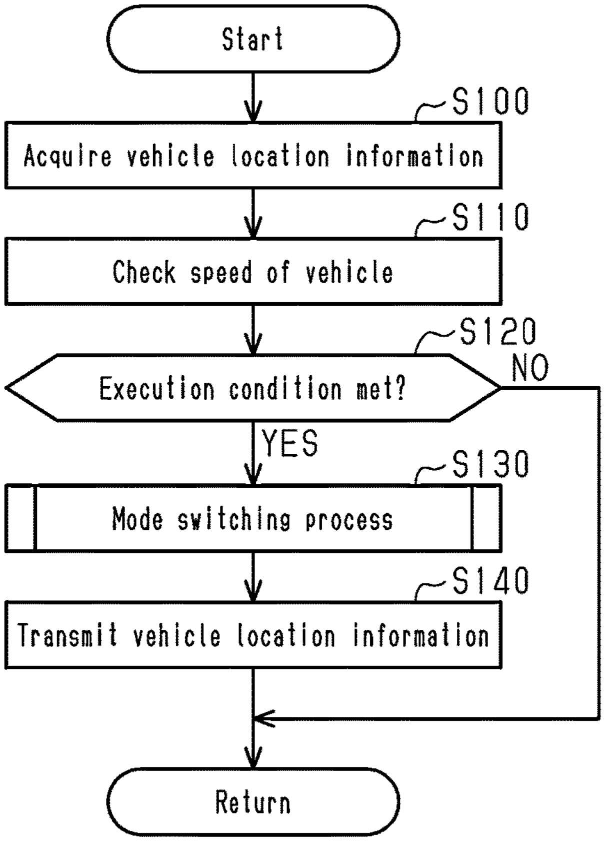
FIG. 2 is a flowchart showing a flow of processing executed by the information processing device shown in FIG. 1.

FIG. 2 is a flowchart showing a flow of processing executed by the information processing device 10. This series of processes is repeatedly executed by the information processing device 10 while the vehicle 100 is in operation. As shown in FIG. 2, when the series of processes is started, the information processing device 10 first acquires the vehicle location information by the location information acquiring device 20 in the process of step S100. Specifically, the navigation device 40 receives radio waves from a satellite by a receiver of a satellite positioning system while the vehicle 100 is traveling, and grasps the current location of the vehicle 100 using the received radio waves. The location information acquiring device 20 acquires the current location of the vehicle 100 from the navigation device 40.

Next, in the process of step S110, information processing device 10 checks the speed of vehicle 100. The speed of the vehicle 100 may be a speed that can be acquired by a known method, for example, a speed detected by a vehicle speed sensor mounted on the vehicle 100 or a speed displayed on a dashboard of the vehicle 100.

Next, in the process of step S120, information processing device 10 determines whether or not an execution condition for transmitting the vehicle location information to the server 200 is satisfied. The execution condition is a condition for determining that the information processing device 10 is in a state in which the vehicle location information can be accurately grasped. After the vehicle 100 starts operating, it takes a certain amount of time for the navigation device 40 to start receiving radio waves from a satellite. The vehicle location information can be grasped by using the radio wave received from the satellite, and when the vehicle travels at a certain vehicle speed, it can be determined whether the vehicle location information is accurately grasped on the basis of the transition of the vehicle location information and the vehicle speed. The execution condition is, for example, a logical product of the following two conditions. That is, the information processing device 10 determines that the execution condition is satisfied when both of the following two conditions are satisfied.

The vehicle speed is equal to or higher than a second threshold.

The change in the location of the vehicle 100 grasped by the navigation device 40 matches the vehicle speed.

The second threshold is, for example, 40 kilometers per hour. When the execution condition is once satisfied after the operation of the vehicle 100 is started, the information processing device 10 continues to determine that the execution condition is satisfied until the operation of the vehicle 100 is stopped.

When it is determined that the execution condition is satisfied in the process of step S120 (step S120: YES), the information processing device 10 advances the process to step S130.

In the process of step S130, the information processing device 10 performs a mode switching process of switching the transmission interval at which the vehicle location information is transmitted to the server 200 according to the speed range in which the speed of the vehicle 100 is. Details of the mode switching process will be described later with reference to FIGS. 3 and 4.

Next, in the process of step S140, the information processing device 10 transmits the vehicle location information acquired by the location information acquiring device 20 to the server 200. The information processing device 10 transmits the vehicle location information to the server 200 at a transmission interval corresponding to the selected mode. In the process of step S140, the information processing device 10 transmits information on the selected mode to the server 200 together with the vehicle location information acquired by the location information acquiring device 20. Then, the information processing device 10 returns the series of processes.

On the other hand, in the process of step S120, when it is determined that the execution condition is not satisfied (step S120: NO), the information processing device 10 returns the process.

Mode Switching Processing

Hereinafter, the mode switching process executed by the information processing device 10 will be described with reference to FIGS. 3 and 4.

Figure 3:
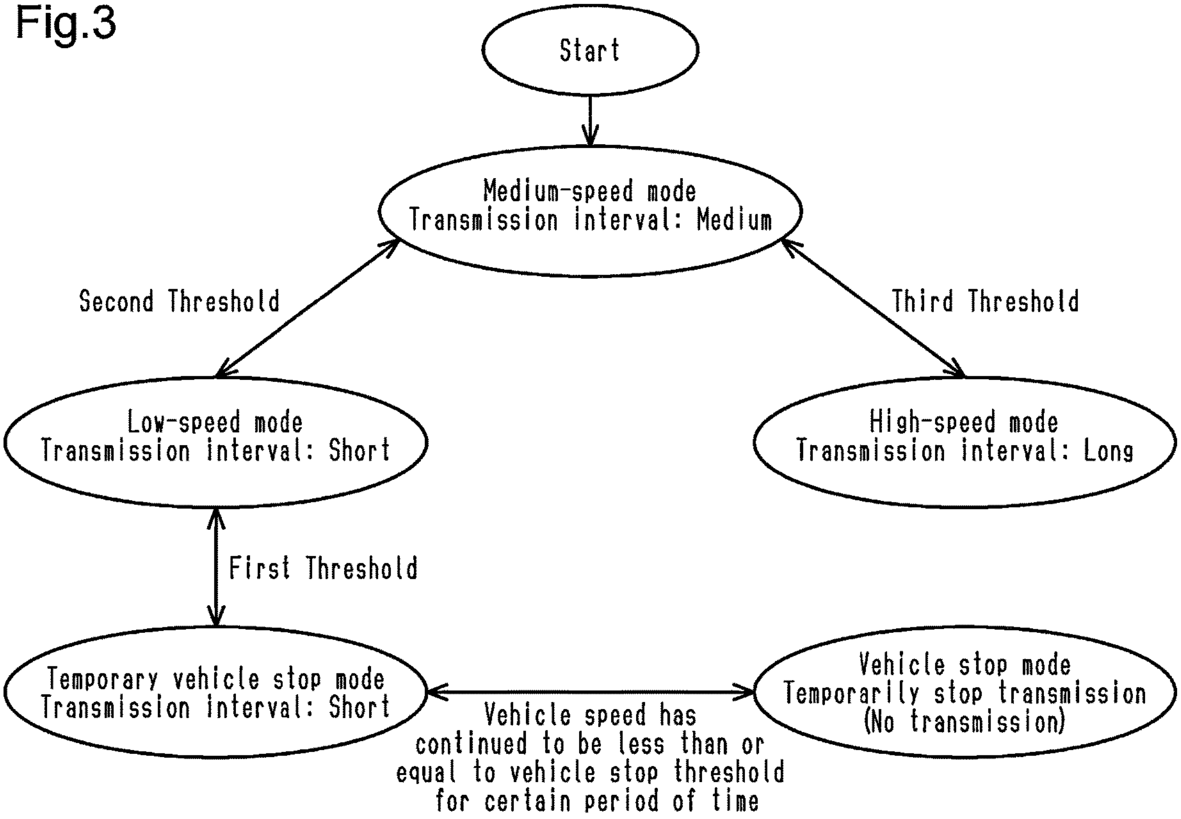
FIG. 3 is a state transition diagram for explaining a mode switching process executed by the information processing device shown in FIG. 1 when a guidance route is not set.

FIG. 3 is a state transition diagram illustrating a mode switching process executed by the information processing device 10 when a guidance route to a destination is not set by the navigation device 40. As shown in FIG. 3, in the mode switching process, the multiple modes corresponding to the speed ranges of the vehicle 100 include a temporary vehicle stop mode, a low-speed mode, a medium-speed mode, and a high-speed mode. The storage 50 of the information processing device 10 stores the multiple modes. The speed range sequentially shifts to higher speeds as the mode transitions from the temporary vehicle stop mode to the low-speed mode, then to the medium-speed mode, and finally to the high-speed mode. Specifically, the high-speed mode is a mode in which the third threshold is set to the lower limit value of the vehicle speed range. That is, the high-speed mode is a mode corresponding to a speed range equal to or higher than the third threshold. For example, the third threshold is 60 kilometers per hour. The medium-speed mode is a mode in which the second threshold lower than the third threshold is the lower limit value of the speed range. In other words, the medium-speed mode is a mode corresponding to a speed range equal to or higher than the second threshold and lower than the third threshold. For example, the second threshold is 40 kilometers per hour. The low-speed mode is a mode in which the first threshold lower than the second threshold is the lower limit value of the speed range. That is, the low-speed mode is a mode corresponding to a speed range equal to or higher than the first threshold and lower than the second threshold. For example, the first threshold is 5 kilometers per hour. The temporary vehicle stop mode is a mode corresponding to a speed range less than the first threshold.

The transmission interval of the vehicle location information is set for each mode. A longer transmission interval is set for a mode corresponding to a higher speed range. Specifically, the transmission interval is set to "short" for the temporary vehicle stop mode and the low-speed mode. In the medium-speed mode, the transmission interval is set to "medium". In the high-speed mode, the transmission interval is set to "long".

The transmission interval is an interval at which the information transmitting device 30 transmits the vehicle location information to the server 200. The navigation device 40 and the location information acquiring device 20 acquire the vehicle location information, for example, at intervals of less than one second. The information transmitting device 30 transmits the vehicle location information to the server 200 at a transmission interval set according to the mode. When the transmission interval is "short", the information transmitting device 30 transmits the vehicle location information to the server 200, for example, at an interval of less than one second, which is the same as the interval at which the navigation device 40 and the location information acquiring device 20 acquire the vehicle location information. When the transmission interval is "medium", the information transmitting device 30 transmits the vehicle location information to the server 200, for example, at intervals of several seconds. In this case, the information transmitting device 30 transmits the vehicle location information acquired at that time to the server 200 every several seconds. That is, when the transmission interval is "medium", the frequency at which the vehicle location information is transmitted to the server 200 is lower than when the transmission interval is "short". When the transmission interval is "medium", the thinned-out vehicle location information is transmitted to the server 200. When the transmission interval is "long", the information transmitting device 30 transmits the vehicle location information to the server 200 at intervals of, for example, several tens of seconds. In this case, the information transmitting device 30 transmits the vehicle location information acquired at that time to the server 200 every several tens of seconds. That is, when the transmission interval is "long", the frequency at which the vehicle location information is transmitted to the server 200 is lower than when the transmission interval is "medium". In addition, when the transmission interval is "long", more thinned-out location information is transmitted to the server 200 than when the transmission interval is "medium".

As shown in the state transition diagram of FIG. 3, in the mode switching process, the mode transitions each time a transition condition is satisfied. When the execution condition is satisfied and the switching process is started, the switching process is started from the medium-speed mode.

When the medium-speed mode is selected, the transmission interval is set to "medium". When the speed of the vehicle 100 becomes equal to or greater than the third threshold in a state in which the medium-speed mode is selected, the high-speed mode is selected and the mode transitions to the high-speed mode.

When the high-speed mode is selected, the transmission interval is set to "long". When the speed of the vehicle 100 becomes less than the third threshold in a state where the high-speed mode is selected, the medium-speed mode is selected and the mode transitions to the medium-speed mode.

In a case in which the medium-speed mode is selected, when the speed of the vehicle 100 becomes less than the second threshold, the low-speed mode is selected and the mode transitions to the low-speed mode.

When the low-speed mode is selected, the transmission interval is set to "short". When the vehicle speed of the vehicle 100 becomes equal to or higher than the second threshold in a state where the low-speed mode is selected, the medium-speed mode is selected and the mode transitions to the medium-speed mode. When the vehicle speed of the vehicle 100 becomes less than the first threshold in a state where the low-speed mode is selected, the temporary vehicle stop mode is selected and the mode transitions to the temporary vehicle stop mode. When the temporary vehicle stop mode is selected, the transmission interval is set to "short".

In a state where the temporary vehicle stop mode is selected, when the vehicle speed of the vehicle 100 has continued to be less than or equal to the vehicle stop threshold for a certain period of time, the stop mode is selected, and the mode transitions to the vehicle stop mode. The vehicle stop threshold is lower than the first threshold. The stop threshold is, for example, 3 kilometers per hour. The vehicle stop mode is a lowest-speed mode corresponding to the lowest vehicle speed range among the multiple modes. When the stop mode is selected, the information processing device 10 stops the transmission of the vehicle location information. That is, the information processing device 10 does not transmit the vehicle location information to the server 200 in the S140 processing. When the vehicle speed of the vehicle 100 becomes higher than the vehicle stop threshold in a state where the vehicle stop mode is selected, the temporary vehicle stop mode is selected and the mode transitions to the temporary vehicle stop mode.

Figure 4:
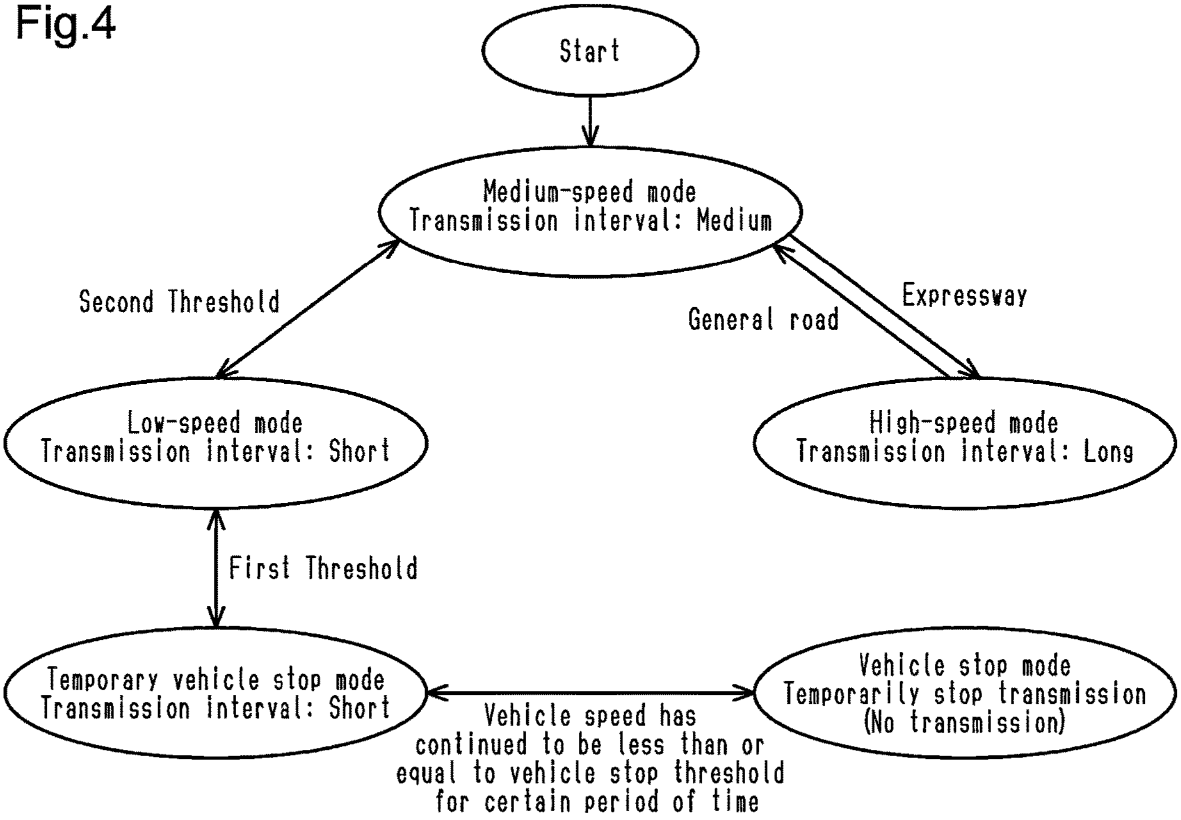
FIG. 4 is a state transition diagram for explaining a mode switching process executed by the information processing device shown in FIG. 1 when a guidance route is set.

FIG. 4 is a state transition diagram illustrating a mode switching process executed by the information processing device 10 when a guidance route to a destination is set by the navigation device 40. The mode switching process executed when the guidance route is set is partially different from the mode switching process executed when the guidance route is not set, which has been described with reference to FIG. 3. Specifically, only the condition for switching to the high-speed mode is different. Therefore, only this difference will be described here. A description of the same configuration as the example of the mode switching process shown in FIG. 3 will be omitted.

When the guidance route is set by the navigation device 40, the navigation device 40 can recognize whether the vehicle 100 is traveling on an expressway or on a general road other than an expressway. Therefore, when the guidance route is set, the information processing device 10 determines whether or not to select the high-speed mode corresponding to the highest speed range in accordance with whether or not the navigation device 40 recognizes that the vehicle 100 is traveling on an expressway, as shown in FIG. 4.

As shown in FIG. 4, specifically, when the navigation device 40 recognizes that the vehicle 100 is traveling on an expressway in a state in which the medium-speed mode is selected, the information processing device 10 selects the high-speed mode. When the navigation device 40 recognizes that the vehicle 100 is not traveling on an expressway in a state where the high-speed mode is selected, the information processing device 10 selects the medium-speed mode. In a state where the vehicle 100 is not traveling on an expressway, the information processing device 10 selects one of the medium-speed mode, the low-speed mode, the temporary vehicle stop mode, and the stop mode in accordance with the speed range.

In this way, the information processing device 10 selects a mode corresponding to the speed range through the switching process. The information processing device 10 transmits the vehicle location information to the server 200 at the transmission interval corresponding to the selected mode through the processing in step S140. In the process of step S140, the information processing device 10 transmits information on the selected mode to the server 200 together with the vehicle location information acquired by the location information acquiring device 20.

Operation of Present Embodiment

The information processing device 10 includes the location information acquiring device 20, which acquires vehicle location information, and the information transmitting device 30, which periodically transmits the vehicle location information acquired by the location information acquiring device 20 to the server 200. The information processing device 10 changes the transmission interval at which the vehicle location information is transmitted to the server 200 in accordance with the speed range in which the speed of the vehicle 100 is. The information processing device 10 causes the transmission interval in the second speed range, in which the speed of the vehicle 100 is higher than in the first speed range, to be longer than the transmission interval in the first speed range. The first speed range and the second speed range correspond to any two or more speed ranges among the speed ranges corresponding to the temporary vehicle stop mode, the low-speed mode, the medium-speed mode, and the high-speed mode.

In this way, the information processing device 10 reduces the frequency of transmission from the information processing device 10 to the server 200 as the speed of the vehicle 100 is in a higher speed range.

Advantages of Present Embodiment (1) When the vehicle speed increases, the information processing device 10 increases the transmission interval at which the vehicle location information is transmitted to the server 200. For example, when the vehicle speed is relatively high, the drivable roads are limited. Thus, the server 200 predict the travel route of the vehicle 100 somewhat accurately without frequently receiving the vehicle location information. Therefore, when the vehicle speed is relatively high, the information processing device 10 can suppress the frequency of transmission from the information processing device 10 to the server 200 by increasing the transmission interval at which the vehicle location information is transmitted to the server 200. This suppresses the increase in the load on the information processing device 10.

(2) The information processing device 10 includes the storage 50. The storage 50 stores multiple modes, which are selected in accordance with the speed range in which the speed of the vehicle 100 is and in which the transmission interval is set to be longer as the mode corresponds to a higher speed range. The information processing device 10 changes the transmission interval by selecting a mode corresponding to the speed range in which the speed of the vehicle 100 is.

The transmission interval, at which the vehicle location information is transmitted to the server 200, is set to be longer in a mode corresponding to a higher speed range. The information processing device 10 sets the speed ranges of the vehicle 100 in multiple stages, and can also manage the transmission frequency of transmission to the server 200 in multiple stages. The information processing device 10 prevents the frequency of transmission from the information transmitting device 30 to the server 200 from being too high or too low. Therefore, the information processing device 10 can cause the server 200 to efficiently recognize the location of the vehicle 100 while appropriately suppressing the number of times of transmission.

(3) The information processing device 10 stops transmitting the acquired vehicle location information to the server 200 when the speed of the vehicle 100 has continued to be in a speed range in which the lowest-speed mode should be selected from multiple modes for a certain period of time.

When a state of an extremely low vehicle speed range, in which the vehicle 100 is substantially stopped, continues, the location of the vehicle 100 does not change significantly, and thus it is not necessary to transmit the vehicle location information.

The information processing device 10 does not transmit the vehicle location information acquired by the location information acquiring device 20 to the server 200 when the speed of the vehicle 100 has continued to be in the lowest-speed range for a certain period of time. Therefore, when a state of an extremely low vehicle speed range, in which the vehicle 100 is substantially stopped continues, it is possible to limit unnecessary transmission. This suppresses the increase in the load on the information processing device 10.

(4) The information processing device 10 transmits information on the selected mode to the server 200 together with the vehicle location information acquired by the location information acquiring device 20.

The information on the selected mode can be utilized for traffic flow surveys such as a congestion situation of the road on which the vehicle 100 is traveling.

The information processing device 10 transmits not only the vehicle location information but also information on the selected mode to the server 200. Therefore, the information processing device 10 provides the server 200 with not only the vehicle location information but also information on the selected mode.

(5) The information processing device 10 includes the navigation device 40 capable of setting a guidance route to a destination. When a guidance route to a destination is set by the navigation device 40, the information transmitting device 30 determines whether to select a high-speed mode corresponding to the highest-speed range among the multiple modes in accordance with whether or not the navigation device 40 recognizes that the vehicle 100 is traveling on an expressway. The information processing device 10 selects the high-speed mode when the navigation device 40 recognizes that the vehicle 100 is traveling on an expressway. In contrast, the information processing device 10 does not select the high-speed mode when the navigation device 40 recognizes that the vehicle 100 is not traveling on an expressway.

When the vehicle 100 enters an expressway, the information processing device 10 performs switching to the high-speed mode regardless of the vehicle speed. It is possible to recognize that the location of the vehicle 100 is on an expressway from the guidance route information. When the vehicle 100 is on an expressway, the transmission frequency can be suppressed to be low as in the high-speed mode, for example, even if the speed of the vehicle 100 is low due to congestion or the like. This suppresses the increase in the load on the information processing device 10 more efficiently.

Modifications

The above-described embodiment may be modified as follows. The above-described embodiment and the following modifications can be combined as long as the combined modifications remain technically consistent with each other.

As illustrated in FIGS. 3 and 4, the information processing device 10 performs a switching process between modes corresponding to adjacent speed ranges. However, the information processing device 10 may be configured to freely perform switching processing between any two modes of the multiple modes. For example, a switching process between the low-speed mode and the high-speed mode or a switching process between the low-speed mode and the stop mode may be performed.

The storage 50 stores a vehicle stop mode, a temporary vehicle stop mode, a low-speed mode, a medium-speed mode, and a high-speed mode. However, the mode may be changed as appropriate. For example, a larger number of modes respectively corresponding to a larger number of speed ranges may be set, or a smaller number of modes respectively corresponding to a smaller number of speed ranges may be set.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An information processing device for a vehicle, comprising:
- processing circuitry that is configured to
  - acquire vehicle location information that is information indicating a location of the vehicle,
  - periodically transmit the acquired vehicle location information to a server, and
  - change a transmission interval at which the vehicle location information is transmitted to the server in accordance with a speed range in which a speed of the vehicle is, wherein
- the speed range is one of at least a first speed range and a second speed range in which the speed of the vehicle is higher than in the first speed range,
- the processing circuitry is configured to cause the transmission interval in the second speed range to be longer than the transmission interval in the first speed range,
- the information processing device further comprises a storage that stores multiple modes in which the transmission interval is set to be longer for a mode corresponding to a higher speed range, and
- the processing circuitry is configured to change the transmission interval by selecting a mode corresponding to the speed range in which the speed of the vehicle is from the multiple modes.

2. The information processing device according to claim 1, wherein
- the multiple modes include a lowest-speed mode corresponding to a lowest-speed range, and
- the processing circuitry is configured to stop transmitting the acquired vehicle location information to the server when the speed of the vehicle has continued to be in a speed range in which the lowest-speed mode should be selected for a certain period of time.

3. The information processing device according to claim 1, wherein the processing circuitry is configured to transmit information regarding a selected mode to the server together with the acquired vehicle location information.

4. The information processing device according to claim 1, further comprising a navigation device configured to set a guidance route to a destination, wherein
- the multiple modes include a high-speed mode corresponding to a highest speed range, and
- the processing circuitry is configured to, in a case in which a guidance route to a destination is set by the navigation device,
  - select the high-speed mode when the navigation device recognizes that the vehicle is traveling on an expressway, and
  - not select the high-speed mode when the navigation device recognizes that the vehicle is not traveling on an expressway.

* * * * *